United States Patent [19]

Beresniewicz et al.

[11] Patent Number: 5,049,714
[45] Date of Patent: Sep. 17, 1991

[54] NON-MELTING MICROWAVE SUSCEPTOR FILMS

[75] Inventors: Aleksander Beresniewicz; Robert E. Fuller, both of Wilmington; Eric N. Mui; John R. Fisher, both of Hockessin, all of Del.

[73] Assignee: E. I. Du Pont de Nemours & Company, Wilmington, Del.

[21] Appl. No.: 388,923

[22] Filed: Aug. 3, 1989

[51] Int. Cl.⁵ .................... H05B 6/80; B65D 81/34
[52] U.S. Cl. ................ 219/10.55 E; 219/10.55 F; 426/107; 426/234; 426/243; 99/DIG. 14; 428/34.7; 428/35.8
[58] Field of Search ............... 219/10.55 E, 10.55 F; 426/107, 109, 110, 113, 114, 115, 234, 241, 243, 127; 428/34.6, 34.2, 34.7, 35.7, 35.8, 35.9; 99/DIG. 14

[56] References Cited

U.S. PATENT DOCUMENTS

| | | | |
|---|---|---|---|
| 3,783,115 | 1/1974 | Zeppenfeld . | |
| 3,924,013 | 12/1975 | Kane | 426/234 |
| 4,190,757 | 2/1980 | Turpin et al. | 219/10.55 E |
| 4,267,420 | 5/1981 | Brastad | 219/10.55 E |
| 4,434,197 | 2/1984 | Petriello et al. | 219/10.55 E |
| 4,641,005 | 2/1987 | Seiferth | 219/10.55 F |
| 4,705,707 | 11/1987 | Winter | 426/107 |
| 4,713,510 | 12/1987 | Quick et al. | 219/10.55 E |
| 4,735,513 | 4/1988 | Watkins et al. | 219/10.55 E |
| 4,820,893 | 4/1989 | Mode | 219/10.55 E |
| 4,851,632 | 7/1989 | Kaliski | 426/113 |
| 4,911,938 | 3/1990 | Fisher et al. | 219/10.55 E |

FOREIGN PATENT DOCUMENTS 0276654  8/1988  European Pat. Off. .

OTHER PUBLICATIONS

U.S. Patent Application 07/188,556, Fong, filed 4/88.
U.S. Patent Application 07/337,159, Fuller, filed 4/89.

*Primary Examiner*—Philip H. Leung

[57] ABSTRACT

A multilayer structure comprising a layer of film susceptible to melting when used in conjunction with a microwave susceptor, a layer of microwave susceptor material, and a layer formed from a crosslinked melt extrudable material does not melt when used in a microwave oven.

7 Claims, 1 Drawing Sheet

NON-MELTING MICROWAVE SUSCEPTOR FILMS

BACKGROUND OF THE INVENTION

This invention relates to packaging materials and particularly to conformable films which are microwave susceptive and useful for food packaging and microwave cooking.

There has been much interest recently in packaging materials which aid in browning and crispening of food items in a microwave oven. U.S. Pat. No. 4,267,420, Brastad, discloses a food item wrapped with plastic film having a very thin coating thereon. An additional sheet or film of plastic is optionally laminated to the coating for abrasion protection. Other exterior support by more rigid dielectric materials such as paperboard and the like is also disclosed. The coating converts some of the microwave energy into heat which is transmitted directly to the surface portion of the food so that a browning and/or crispening is achieved.

U.S. Pat. No. 4,641,005, Seiferth, discloses a disposable food receptacle for use in microwave cooking, which includes a provision to brown the exterior of the food in the receptacle. A thin layer of an electrically conductive material is incorporated into the receptacle on the food contacting surfaces thereof, so that the conductive layer will become heated by the microwave radiation and will, in turn, brown the exterior of the food in the receptacle. The receptacle includes a smooth surfaced plastic film, as a protective layer, and a support means formed of paper stock material.

U.S. Pat. No. 4,713,510, Quick et al., discloses a microwave ovenable package including a layer of material that will convert a portion of the microwave energy to heat and a layer of paperboard interposed between the energy-converting layer and the food. The energy-converting layer may be carried on a plastic film, and an additional layer of paperboard may be used to sandwich the energy-converting layer and the plastic film between layers of paperboard. For the purpose of providing a more intense heating effect, two energy-converting layers, each on a dielectric substrate, sandwiched together between layers of paperboard, are disclosed.

U.S. patent application Ser. No. 07/188,556 discloses a conformable multilayer structure useful for packaging food for microwave cooking. The structure comprises at least one layer of flexible, heat resistant, microwave transparent film, e.g., PET; at least one layer of flexible, heat resistant, heat stable, microwave transparent plastic film, e.g., heat stabilized PET or cellophane; and at least one layer of substantially continuous microwave susceptor material located on a surface of a film of the laminate. The various layers of the laminate can be held together by adhesive, e.g. a crosslinkable copolyester.

One persistent problem in microwave film structures is overheating and melting of areas of the film which are, for example, not in contact with food as a heat sink or which represent overlapping areas with multiple thicknesses of susceptor material. Several attempts have been made to avoid this problem. U.S. Pat. No. 4,735,513, Watkins et al., April 5, 1988, discloses a flexible, sheet structure comprising a base sheet of e.g. polyester, having a microwave coupling layer. The sheet may be laminated to a backing sheet of dimensionally stable flexible material transparent to microwaves. Examples of such backing sheets include a synthetic sheet formed from synthetic plastic fibers of a non-thermoplastic and dimensionally stable composition, or, preferably, paper. The microwave coupling layer is present as an island covering selected areas of the sheet. The uncoated portions will not be heated and will not be damaged by microwave energy.

European patent application 0 276 654, published Aug. 3, 1989 discloses a method of making a susceptor material in which a liquid component carrying distributed microwave interactive particles is dried on a receiving surface such as paper or film. A protective layer may cover the distributed particles interactive layer after drying. The liquid component comprises a crosslinking synthetic resin, cured for example by subjecting it to heat to fix the particles in their distributed condition.

Other approaches to solve this problem are illustrated in U.S. patent application Ser. Nos. 07/245,153 and 07/337,159. The former application discloses a microwave cooking package in which an insulating layer is provided between regions of the film laden with susceptor which are in proximity with each other, thereby preventing such regions from overheating. The latter application discloses a package in which seal areas are protected from overheating by means of a reflective shield.

In spite of extensive work in this area, there remains a need for microwave susceptor films, and particularly microwave susceptor films which are conformable and preferably transparent, which do not melt, shrivel, shrink, or otherwise deform in seam areas or in areas which are not proximate to food as a heat sink. The present invention provides such a film.

SUMMARY OF THE INVENTION

The present invention provides a conformable multilayer structure useful for packaging food for microwave cooking comprising:

(a) at least one layer of flexible, heat-resistant, microwave-transparent film susceptible to melting upon exposure to temperatures encountered when used in conjunction with a microwave susceptor in a microwave oven;

(b) at least one layer of microwave susceptor material located on an interior surface of the film of (a) in sufficient quantity to cause the multilayer structure to heat under microwave cooking conditions to a temperature suitable for browning or crispening of food placed adjacent thereto; and (c) at least one layer formed from a melt extrudable material crosslinked to a sufficient extent and present in a sufficient thickness to in combination substantially prevent melting of the structure when used in a microwave oven.

The invention further provides a multilayer structure useful for packaging food for microwave cooking comprising:

(a) at least one layer of flexible, heat-resistant, microwave-transparent film susceptible to melting upon exposure to temperatures encountered when used in conjunction with a microwave susceptor in a microwave oven;

(b) at least one layer of microwave susceptor material located on an interior surface of the film of (a) in sufficient quantity to cause the multilayer structure to heat under microwave cooking conditions to a temperature suitable for browning or crispening of food placed adjacent thereto;

(c) at least one layer formed from a melt extrudable material present in a sufficient thickness to substantially prevent distortion of the structure when used in a microwave oven; and (d) at least one layer of a microwave transparent substrate which does not melt upon exposure to temperatures encountered when used in conjunction with a microwave susceptor in a microwave oven, located adjacent to the material of (c).

DETAILED DESCRIPTION OF THE INVENTION

Figure 1:
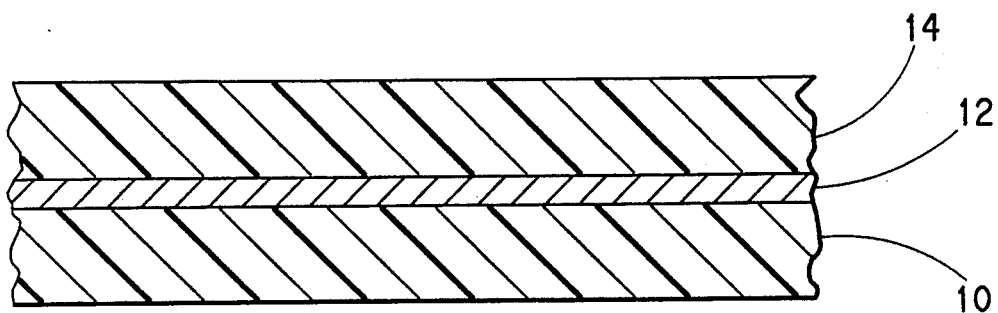
FIG. 1 shows one embodiment of the present invention.

The first required component of the present invention is a flexible, heat-resistant, microwave transparent film. The film can be made of any suitable plastic film which has the desired properties of heat resistance and microwave transparency. The term "heat resistant" is intended to denote a film which is suitable for ordinary use in a microwave oven, that is, one that will not chemically degrade or melt when in contact with food during an ordinary microwave cooking process, normally e.g. 100°-200° C. However, such films are not necessarily suitable for use by themselves as a substrate for microwave susceptor materials in microwave active packaging structures. The presence of susceptor materials (described below) on the surface of such a film can give rise to localized areas in which the film is exposed to temperatures far in excess of those generated by ordinary microwave cooking. Such excessive heating may be encountered, for example, if the film is not in close contact with a food item to act as a heat sink. Or overheating may arise in areas where two layers of susceptor-laden film are sealed together, as in a package seam. While some polymers, such as polyimides, may have sufficient thermal stability to withstand the temperatures generated locally under such conditions, they may be quite expensive or have other properties such as potential toxicity which make them unsuitable. Many other polymers which are normally considered heat stable do not have the necessary resistance to melting and degradation when used with a susceptor. For example, polyethylene terephthalate (PET) is a widely used material for packaging of foods for microwave use, having a relatively high melting point of 250°-260° C. Nevertheless, it remains susceptible to melting, excessive wrinkling, and shrinking under such cooking conditions. The present invention is directed to improving the resistance to melting and excessive shrinking of structures which are based at least in part on such films.

It should be noted that "melting" as it relates to films of the present invention is intended to signify the formation of a discernable liquid or apparently melted material on a macroscopic scale. It is understood that polymers may be composed of crystalline and noncrystalline regions and that melting, in a technical or microscopic sense, can refer to melting of such crystalline regions. However, a "melting" polymer, in the present invention, is one which at high temperature softens and flows, whether it be amorphous or crystalline at low temperatures. A polymer which "does not melt," conversely, might char when excessively heated but will not melt in terms of practical functioning. Such polymers include those with crosslinks which prevent melt flow, even though microscopic melting of crystallites may occur at elevated temperature.

The thickness of this film is not critical, but it should be thick enough to be readily handleable without damage and preferably thin enough to retain flexibility so as to be conformable to a food substance. Films about 8 to about 50 micrometers (0.3-2 mils) thickness, and preferably about 12 to about 38 micrometers (0.5-1.5 mils), are quite suitable.

Examples of such films include polyesters such as PET and heat stabilized PET, polyamides including amorphous polyamides, and certain higher melting polyolefins such as polypropylene. The preferred film is PET.

The heat resistant film described above is provided with a microwave susceptive material in the form of a coating or layer which extends over at least a portion of its surface area. The coating may be of any material suitable for conversion of at least a portion of incident microwave radiation to heat, preferably by interacting with at least the electric component of the microwave field. For example, the susceptive material can be in the form of a coating of (i) about 5 to 80% by weight of metal or metal alloy susceptor in flake form, embedded in (ii) about 95 to 20% by weight of a thermoplastic dielectric material. More preferably the relative amount of such susceptor will be about 25 to 80% by weight, and most preferably about 30 to 60% by weight. A coating thicknesses of about 0.01 mm to about 0.25 mm (about 0.4 to 10 mils) is suitable for many applications. The surface weight of such a susceptor coating on the substrate is from about 2.5 to 100 $g/m^2$, preferably about 10 to about 85 $g/m^2$.

Suitable thermoplastic dielectric materials in which the susceptor flake may be embedded include, but are not limited to, polyesters selected from the group consisting of copolymers of ethylene glycol, terephthalic acid, and azelaic acid; copolymers of ethylene glycol, terephthalic acid, and isophthalic acid; and mixtures of these copolymers. Other polymers, such as certain polyamides, can also be used.

Suitable susceptor flake materials for use in this embodiment of the invention include aluminum, nickel, antimony, copper, molybdenum, iron, chromium, tin, zinc, silver, gold, and various alloys of these metals. Preferably the susceptor flake material is aluminum or stainless steel. The flakes of the susceptor should have an aspect ratio of at least about 10, and will preferably have a diameter of about 1 to about 48 micrometers, and a thickness of about 0.1 to about 0.5 micrometers. In order to obtain uniformity in heating, it is preferred that the flakes be approximately circular, having an ellipticity in the range of about 1:1 to 1:2. Alternatively, the flakes, if not circular, can be applied to the film in two or more separate passes, which also provides an improvement in the degree of uniformity of heating. Films prepared from such material will typically have a surface resistance of at least $1 \times 10^6$ ohms per square, and are normally optically opaque. Such films are described in more detail in copending U.S. patent application Ser. No. 002,980, filed Jan. 20, 1987, the disclosure of which is incorporated herein by reference.

Alternatively, the base film can be coated with a thin layer of susceptor material by vacuum deposition techniques. In this embodiment, the susceptor material can be a substantially continuous electrically conductive material which is present in sufficient thickness to cause the multilayer structure to heat under microwave cooking conditions to a temperature suitable for browning or crispening of food placed adjacent thereto, but not so thick as to completely prevent penetration of microwave energy to the interior of the food. A preferred susceptor material is vacuum metallized aluminum or stainless steel, which will preferably be present in sufficient amounts to impart an optical density, in the case of aluminum, of about 0.10 to about 0.35, preferably 0.16 to about 0.25, to the film. (Such film, as an additional benefit, will be substantially transparent to visible light). Other metals, of course, may be used, including gold, silver, mu-metal, stainless steel, nickel, antimony, copper, molybdenum, bronze, iron, tin, and zinc. Methods other than vacuum deposition may also be used if they provide a substantially continuous layer of the desired thickness.

The amount of susceptor material applied to the film, whether metal flake, continuous metallized layer, or other material, may be varied within certain limits which will be apparent to one skilled in the art. The test to determine the correct amount of material is whether the coating will heat to the proper temperature and provide sufficient heat flux for browning or crispening of food items. The required temperature may depend on the particular food item used but for many applications is at least about 180° C.

The present structure further comprises at least one layer formed from a melt extrudable material which is applied to cover the layer of susceptor material. This extrudable material should also be a material which is crosslinkable under e.g. the influence of ionizing radiation. (Ordinary PET, as used as the base layer, above, is not considered to be susceptible to radiation crosslinking.) A preferred class of such material includes ethylene homo- and copolymers such as low density polyethylene, linear low density polyethylene, and copolymers of ethylene with vinyl esters such as vinyl acetate or vinyl propionate, or with acrylic, methacrylic, or itaconic acids or their esters. The most preferred melt extrudable material for use in the present invention is a copolymer of ethylene and about 3 to about 20 weight percent, and preferably about 5 to about 15 weight percent, acrylic or methacrylic acid.

When the melt extrudable material is present in a certain amount and crosslinked to a certain degree, the resistance of the resulting laminar structure to melting, distortion, or shrinkage upon heating in a microwave oven is greatly increased. The minimum thickness of such a layer in order to observe an improvement appears to be about 7 micrometers (0.3 mils); the minimum extent of crosslinking necessary for an improvement appears to be that obtained by irradiation with about 2 megarads of ionizing radiation. It is observed that the necessary thickness and the necessary degree of crosslinking are interrelated: thinner layers require greater crosslinking than do thicker layers. The preferred film, therefore, is crosslinked to at least an extent indicated by the expression $D = 200/T$, and most preferably to an extent indicated by $D = 375/T$, where D is the approximate dose of radiation in megarads and T is the thickness of the melt extrudable material, in 35 micrometers. Thus a 13 micrometer (0.5 mil) layer should most preferably receive about 30 megarads, while for a 50 micrometer (2 mil) layer, 7 or 8 megarads will give good results. The reason for this relationship is not clearly understood but is believed to relate to a need for increased inherent strength in a thinner layer in order to prevent wrinkling and melting. The increased heat capacity of a thicker layer, acting as a heat sink, may also play a role.

FIG. 1 illustrates the above described embodiment of the present invention. The heat-resistant microwave-transparent film susceptible to melting is shown as 10. The layer of microwave susceptor material is shown as 12, and the layer of melt extrudable crosslinked material is shown as 14. Of course, additional layers may also be present. For example, it is often preferred to use a substantially symmetrical structure, to avoid curling of the film. Such a symmetrical structure could be obtained by adding another layer equivalent to 10 (with or without the susceptor layer) to the outside surface of 14. Or an additional layer of crosslinked material equivalent to 14 could be added to the other side of 10. Likewise two of the structures of FIG. 1 could be laminated together by fusing the two melt extrudable layers 14 prior to crosslinking. A great number of such combinations are possible and are included within the scope of the present invention. Alternatively, a layer of adhesive might be used, either at the interface between 12 and 14 or as a surface layer for sealing purposes when the film is used in a package. (The use of a separate adhesive layer between 12 and 14 is not normally required, at least when the preferred ethylene acid copolymer is used as the crosslinked layer.)

Figure 2:
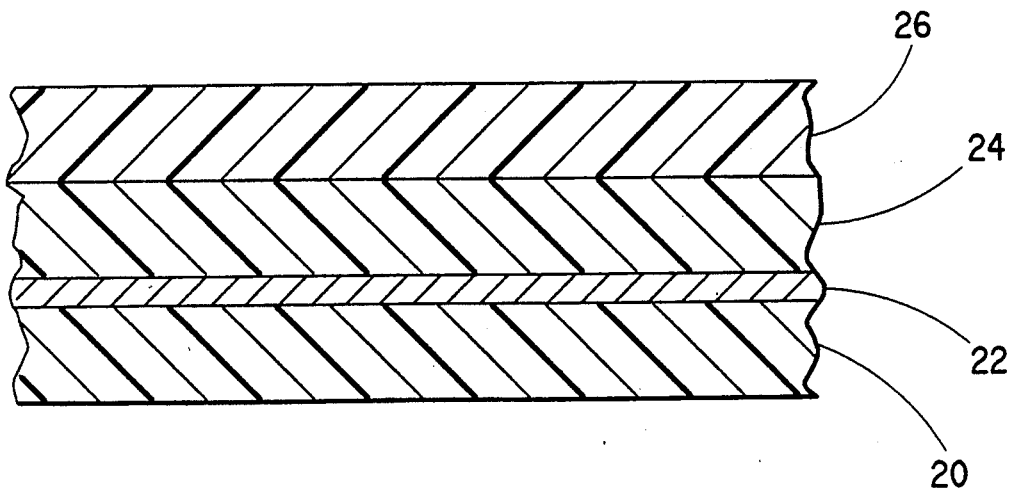
FIG. 2 shows a second embodiment of the present invention.

In particular, for extra thermal stability it is often desirable to add a layer of a microwave transparent substrate having a melting point sufficiently high so as not to melt upon microwave heating in the presence of a susceptor under conditions that would initiate melting of, e.g., PET. Suitable materials for such a nonmelting layer include cellophane, polyimides, polyetherimides, polyesterimides, and polyarylates. Paper or paperboard may also be used where optical transparency is not important and where flexibility and conformability of the resulting structure are less important. Such a structure is illustrated in FIG. 2, where 20 is the heat resistant film susceptible to melting, 22 is the microwave susceptor, 24 is the melt extrudable crosslinked resin, and 26 is the nonmelting material. As described above, additional layers and combinations of layers are possible within the scope of the present invention.

It has additionally been found that when a nonmelting layer is present the extent of crosslinking of the melt extrudable crosslinked layer can be reduced or even eliminated while still retaining a structure with adequate thermal stability. For example, a laminar structure of PET, susceptor, acid copolymer, and cellophane, without irradiation, does not melt in a microwave oven, although some wrinkling and delamination does occur. Irradiation, which is preferred, substantially eliminates these problems. The preferred minimum irradiation for such a structure can be expressed by the formula $D' = 125/T$, where $D'$ is the dose of radiation in megarads and T is the thickness of the crosslinkable layer. Thus in a structure having an acid copolymer layer 12 micrometers (0.5 mils) thick, an appropriate minimum dose is about 10 megarads, while a layer 50 micrometers (2 mils) thick can suitably receive as little as 2 megarads. The higher doses prescribed for the two-polymer compositions, above, can also be used.

The multilayer structures of the present invention can be made by conventional lamination or extrusion techniques, as illustrated more fully in the examples which follow.

EXAMPLE 1

A 50 micrometer (2 mil) polyethylene film, corona treated on one side, was laminated to the aluminum treated side of a metallized polyester film, 12 micrometers (0.48 mils) thick. The aluminum metallization had been applied by vacuum deposition to an optical density of 0.22±0.04. The adhesive was Adcote TM 506-40, a crosslinkable polyester resin from Morton Thiokol, cured with their isocyanate-based curing agent, Catalyst 9L-10. The lamination was conducted at 6.1 m/min (20 ft./min) using a roll laminator at a roll pressure of 45 kg (100 lb.) and a temperature of 88° C. (190° F.). The adherence of the polyethylene film to the metallized polyester film was good, although the film tended to curl toward the polyethylene side. This curling was completely eliminated by adhesively laminating another similar layer of polyethylene to the other side of the metallized polyester film. The composite film was exposed to different doses of electron beam irradiation using commercially available equipment. The resultant structures were evaluated for their ability to generate heat in a 700 W 2450 MHz microwave oven, as well as by cooking experiments.

The heating ability of a given sample was evaluated on the basis of temperature increase above room temperature. The temperature was measured in 5 g of microwave transparent oil (Dow-Corning TM 210H heat transfer silicon oil). The apparatus used included a Pyrex TM borosilicate glass tube, 101 mm long, 15 mm outside diameter, supported in a dewar flask of the same glass, in order to minimize heat loss to the surroundings. A sample of film to be evaluated, 48 mm×11 mm, was wrapped around the tube about 5 mm below the surface level of the oil, with the long dimension of the film extending around the tube circumference. The sample was secured to the tube and to itself using a sliver of a microwave transparent tape prepared from polytetrafluoroethylene. The temperature of the oil in this apparatus upon heating in a microwave oven was measured at 5 second intervals using a Luxtron TM temperature probe located in the oil in the region wrapped by the sample and was centered by placing a cap of polytetrafluoroethylene on the test tube. The temperature probe was connected to suitable recording instrumentation.

Certain of the samples were also evaluated by wrapping and cooking food items. The results are shown in Table I. The melting behavior of the samples in this and other Examples is expressed numerically, where a rating of 1 indicates no melting, even at overlapping seams; 3 indicates some melting in places where there is no food contact as heat sink; 5 indicates melting even where the film touches the food. Ratings of 2 or 4 are intermediate values.

EXAMPLE 2

An aluminized polyester film was prepared as in Example 1. The side not aluminized was corona treated. Onto the metallized side was melt extruded a layer of a copolymer of ethylene and 6 weight percent methacrylic acid, having a melt index of 9. The thickness of the acid copolymer layer was about 38 micrometers (1.5 mils). Coating was effected by use of a 114 mm (4.5 inch) Egan TM extrusion coater/laminator; the melt temperature of the acid copolymer was 287° C. (548° F.). The adhesion was judged to be excellent. The film curled somewhat towards the acid copolymer side; this was overcome by melt extruding a similar layer on the other side of the metallized polyester film. Samples of both the one-side-coated and the two-side-coated films were exposed to different dosages of electron-beam irradiation and were evaluated for heating ability as well as performance in actual cooking tests. The results of these tests are shown in Table I.

TABLE I

| Ex. | Run | Number of Coating Layers | Radiation dose, Mrad | Temp. rise, C.° | Cooking Test[a] fruit turnover | bagel |
|---|---|---|---|---|---|---|
| 1* | 1 | 2 | 0 | 113 | 4 | 2 |
| 1 | 2 | 2 | 10 | 132 | | |
| 1 | 3 | 2 | 15 | 96 | 1 | 1 |
| 1 | 4 | 2 | 20 | 105 | | |
| 1 | 5 | 2 | 30 | 91 | | |
| 2 | 1 | 2 | 5 | 95 | | 5 |
| 2 | 2 | 2 | 15 | 156 | | |
| 2 | 3 | 2 | 20 | 124 | | 1 |
| 2 | 4 | 1 | 15 | 163 | | 1 |

[a]Lack of an entry indicates test not done. For each test, a slight waxy odor was observed.
*Indicates a comparative example.

EXAMPLE 3

An aluminized polyester film was prepared as in Example 1. A layer of the ethylene/methacrylic acid copolymer of Example 2 was extruded onto the metallized surface of the polyester film using the same melt-extrusion equipment of Example 2. The acid copolymer was melt-extruded at a melt temperature of 310° C. (590° F.) and a rate of 61 m/min (198 ft./min), with a coating thickness of about 25 micrometers (1 mil). The coating rate was increased to 122 m/min (397 ft./min) to coat a thickness of about 10–13 micrometers (0.4–0.5 mils). The films so prepared were heat laminated, coated side to coated side, to give structures with about 25, 38, and 51 micrometers (1, 1.5, and 2 mils) of acid copolymer between two layers of metallized polyethylene terephthalate. The lamination conditions were: nip pressure, 0.7 MPa (100 psi); nip temperature, 150° C. (300° F.); speed, 40 m/min (130 feet/min). The laminated structures were exposed to several different dosages of electron beam radiation and were evaluated by determining the ability of the various films to generate heat in a microwave oven, as described above, and by microwave cooking experiments. Results are shown in Table II.

EXAMPLE 4

Structures similar to those of Example 3 were prepared by heat lamination of three films: films of acid copolymer were laminated between two films of the metallized polyethylene terephthalate described above. The acid copolymer thickness was about 25 and 51 micrometers (1 and 2 mils), as indicated in Table II. Results of testing are shown in Table II. The structures of the last entry in Table II were made by a one-step melt extrusion heat lamination process.

TABLE II[a]

| Ex. | Run | Polyolefin Thickness μm | Radiation dose, Mrad | Temp. rise, C.° | Cooking Test[b] french fries | bagel | chicken nuggets |
|---|---|---|---|---|---|---|---|
| 3* | 1 | 51 | 0 | 164 | 5 | | 5 |
| 3 | 2 | 51 | 10 | 164 | 3 | | |
| 3 | 3 | 51 | 15 | 164 | 3 | | |
| 3 | 4 | 51 | 20 | 163 | 1 | | |
| 3* | 5 | 38 | 0 | 166 | | | 5 |

TABLE II[a-continued]

| Ex. | Run | Polyolefin Thickness μm | Radiation dose, Mrad | Temp. rise, C.° | Cooking Test[b] french fries | bagel | chicken nuggets |
|---|---|---|---|---|---|---|---|
| 3 | 6 | 38 | 15 | 162 | 3 | | |
| 3 | 7 | 38 | 20 | 146 | | | |
| 3 | 8 | 38 | 30 | | | 1 | |
| 3* | 9 | 25 | 0 | 161 | | 5 | 5 |
| 3 | 10 | 25 | 10 | 153 | | 4 | |
| 3 | 11 | 25 | 15 | 164 | | 5 | |
| 3 | 12 | 25 | 20 | 150 | | 1 | |
| 4* | 1 | 51 | 0 | 166 | | | |
| 4 | 2 | 51 | 20 | 158 | 4 | | |
| 4* | 3 | 25 | 0 | 168 | 5 | | |
| 4 | 4 | 25 | 20 | 168 | 1 | | |
| 4* | 5 | 13 | 0 | 176 | | 5 | |
| 4 | 6 | 13 | 30 | 174 | | 3 | |
| 4 | 7 | 13 | 45 | 162 | | 1 | |

[a]Lack of entry indicates test or measurement not performed.
[b]In the 51 and 38 μm tests of example 3 and the 51 μm tests of example 4, a slight waxy odor was detected.
*Comparative example.

EXAMPLE 5

A coating of about 30 micrometers (1.2 mils) of an ethylene-acid copolymer containing 9 weight % methacrylic acid and having a melt index of 10 dg/min was extruded onto a corona-treated PET film, 12 micrometers thick. The corona treatment was carried out in-line, just before the melt coating operation. The melt temperature was 310° C. (590° F.) and the coating speed was 56 m/min (185 ft/min). The coated film was heat laminated to a layer of aluminized PET described in Example 1. The resulting laminate was transparent, flexible, and showed no tendency to curl. (A similar structure was also prepared in a one-step melt extrusion-lamination process. In this case the acid copolymer had 5% copolymerized methacrylic acid and a melt index of 9. The copolymer layer made by this process was 13 micrometers (0.5 mils) thick in one example and 36 micrometers (1.4 mils) thick in another example.)

The susceptor films so prepared were exposed to several levels of electron beam irradiation. The irradiated films were evaluated as in Example 1. The results are shown in Table III.

TABLE III[a]

| Ex. | Run | Polyolefin Thickness μm | Radiation, Mrad | Temp. rise, C.° | Cooking Test french fries | bagel | fruit turnover |
|---|---|---|---|---|---|---|---|
| 5* | 1 | 36 | 0 | 150 | | | 2 |
| 5 | 2 | 36 | 20 | 155 | | | 1 |
| 5* | 3 | 30 | 0 | 134 | | | |
| 5 | 4 | 30 | 15 | 123 | 1 | 1 | |
| 5* | 5 | 13 | 0 | 180 | | 5 | |
| 5 | 6 | 13 | 15 | 163 | | 2 | |
| 5 | 7 | 13 | 30 | 155 | | 1 | |
| 5 | 8 | 13 | 45 | 172 | | 1 | |

[a]Lack of entry indicates test or measurement not performed.
*Comparative example.

EXAMPLE 6

A structure was prepared by lamination of three different films (process "A" in Table IV). The films included the aluminized PET described in Example 1, an uncoated cellophane film, and, located between the two preceding films, a layer of a copolymer of ethylene with 12 weight percent methacrylic acid, having a melt index of 2. The lamination was conducted at 7.6 m/min (25 ft/min) at 177° C. and a roll pressure of 45 kg (100 lbs). Similar structures were made by melt extruding the acid copolymer onto the metallized film, then laminating a cellophane film immediately to the still-hot acid copolymer layer (process "B" in Table IV).

The results of evaluation of these films are shown in Table IV. The films do not melt even in the absence of irradiation. However, the films had an improved appearance, after cooking in the microwave oven, if they had been exposed to some electron beam irradiation, in that they showed less wrinking and puckering

TABLE IV[a]

| Ex. | Run | Process | Polyolefin Thickness m | Radiation, Mrad | Temp. rise, C.° | Cooking Test french fries | fruit turnover |
|---|---|---|---|---|---|---|---|
| 6 | 1 | A | 25 | 0 | 135 | 2 | 2 |
| 6 | 2 | A | 25 | 10 | 123 | 1 | 2 |
| 6 | 3 | A | 25 | 20 | 123 | 1 | |
| 6 | 4 | B | 38 | 0 | 148 | 2 | 3 |
| 6 | 5 | B | 38 | 12 | 148 | 2 | 1 |
| 6 | 6 | B | 13 | 0 | 154 | 3 | |
| 6 | 7 | B | 13 | 10 | 138 | 2 | |

[a]Lack of entry indicates test or measurement not performed.

EXAMPLE 7

A sheet of 0.12 mm (92 gauge) PET film was coated with a dispersion of Reynolds aluminum flake LSP-548 in a binder. The aluminum was in the form of circular or elliptical flakes having a thickness of about 0.3 micrometers and a diameter of about 30 micrometers. The binder consisted of an organic matrix polymer prepared from the condensation of 1.0 mol ethylene glycol with 0.53 mol terephthalic acid and 0.47 mol azelaic acid, dissolved in a mixture of toluene and tetrahydrofuran. A small amount of erucamide was also present in the mixture (about 3% based on the weight of the polymer). About equal parts by weight of aluminum flake and matrix polymer were used. The dispersion was applied to the film by a solution coating process and the solvent removed by passing the coated film through a heated tunnel. The resulting film had a coating of about 20 g/m² aluminum. A 25 micrometer (1 mil) film of the acid copolymer of Example 1 was melt extruded onto the aluminum flake coating using the equipment described above. The acid copolymer melt temperature was 312° C., the air gap was 200 mm (8 inches) and the speed was 61 m/min (200 ft./min). The adhesion of the acid copolymer to the aluminum coating was good.

Two layers of the above film were heat-laminated, acid copolymer layer to acid copolymer layer. The resulting composite film was exposed to electron beam irradiation to effect crosslinking of the polyolefin. Heating and cooking evaluations are summarized in Table V.

EXAMPLE 8

A layer of the film coated with a single layer of aluminum flake in matrix, prepared as in Example 7, was coated with a layer of a copolymer of ethylene with 12 weight percent methacrylic acid, melt index 7. While the acid copolymer coating was still hot, a layer of cellophane (regenerated cellulose) was laminated thereto. The melt temperature of the acid copolymer was 280° C. (536° F.), and the speed was 56 m/min (191 ft/min). The laminate was exposed to electron beam irradiation to effect crosslinking of the polyolefin. Heating and cooking evaluations are summarized in Table V.

TABLE V[a]

| Ex. | Run | Polyolefin Thickness μm | Radiation dose, Mrad | Temp. rise, C.° | Cooking Test bagels |
|---|---|---|---|---|---|
| 7* | 1 | 51 | 0 | 61 | 5 |
| 7 | 2 | 51 | 10 | 67 | 3 |
| 7 | 3 | 51 | 15 | 62 | 3 |
| 7 | 4 | 51 | 20 | 58 | 2 |
| 8 | 1 | 38 | 0 | 45 | |
| 8 | 2 | 38 | 10 | 49 | 1 |

[a] Lack of entry indicates test or measurement not performed.
*Comparative Example

COMPARATIVE EXAMPLES A AND B

The film of Comparative Example A was prepared by lamination of one layer of 0.12 micrometer PET film to each side of as similar film that had been vacuum aluminized as in Example 1. The same adhesive and lamination technique described in Example 1 were used. The film of Comparative Example B was similar, except that the films were adhered using an amorphous polyester, supplied as a solution (Whittaker Corporation, "Resin 49002"). The results of testing of these structures are shown in Table VI.

TABLE VI

| Ex. | Polyolefin Thickness μm | Radiation dose, Mrad | Heat rise, C.° | Cooking Test french fries | bagel |
|---|---|---|---|---|---|
| A | 0 | 0 | 163 | 4 | 3 |
| B | 0 | 0 | 170 | 5 | 5 |

EXAMPLE 9 AND COMPARATIVE EXAMPLES C AND D

For Example 9, a 13 micrometer (0.5 mil) layer of the same acid copolymer used in Example 2 was melt extruded onto a piece of 468 micrometer (18 mil) paperboard, and a 13 micrometer (0.5 mil) PET film, aluminum metallized by vacuum deposition to an optical density of 0.22±0.04 was immediately laminated to the still-hot melt of acid copolymer. The melt temperature was 306° C. (582° F.) and the line speed was 58 m/min (190 feet/min). A sample of the structure thus prepared was exposed to 20 Mrad of electron beam irradiation; another sample was not irradiated. Comparative Example C was a commercially available structure used as a heating platform for pizza (Pillsbury TM). This structure comprised a layer of paperboard and a layer of aluminized PET, joined together using an adhesive. Comparative Example D was a similar structure obtained from a package of french fries (Ore-Ida TM). Squares of each sample, 14 cm × 14 cm (5.5 × 5.5 inches) were exposed to microwave energy by placing them at the center of a 600 W microwave oven resting atop an inverted paper tray. Separate samples were evaluated after various lengths of exposure to microwave energy, as indicated in Table VII.

After exposure, the samples were examined for microcracks in the PET film. Such cracking is undesirable in that it suggests deterioration of the PET film as a functional barrier between a foodstuff and the susceptor and adhesive materials. Samples were rated on the following scale of 1 to 5:
1 = no visible cracks
2 = small cracks, barely visible
3 = similar to 2, but more visibility
4 = large cracks, very visible
5 = similar to 4, cracks extending to underlying layer (exposed paperboard).

The results, in Table VII, show that the structures of the present invention, particularly when treated with ionizing irradation, exhibit improved resistance to microcracking. (The samples of Example 9 which were not treated with ionizing irradiation exhibited shrinkage of the PET film after about 30 seconds of microwave exposure, separation of the film from the paperboard, and development of holes in the PET film; the other materials in the table did not exhibit such behavior.)

Heating uniformity of the samples was evaluated by visually observing the browning imparted to the paperboard layer upon microwave heating, and rating on the following scale:
1 = even browning
2 = certain areas browned a little more
3 = nonuniformity more visible
4 = observable hot spots
5 = hot spots more visible.

The results in Table VII show that the heating performance of the structures of the present invention is more uniform than that of the comparative examples.

The heating ability of selected samples, measured as temperature rise as described above, before and after heating in the microwave oven, is also reported in Table VII.

TABLE VI[a]

| Ex. | Run | Polyolefin Thickness μm | Irradiation Mrad | Oven Exposure, s | Microcracking | Heating Uniformity | Temp. Rise C.° |
|---|---|---|---|---|---|---|---|
| 9 | 1 | 13 | 0 | 0 | | | 159 |
| | | | | 15 | | | 62 |
| | | | | 30 | 2 | 1 | 50 |
| | | | | 45 | 3 | 2 | |
| | | | | 60 | 3 | 3 | |
| 9 | 2 | 13 | 20 | 0 | | | 166 |
| | | | | 15 | | | 54 |
| | | | | 30 | 2 | 1 | 35 |
| | | | | 45 | 2 | 1 | |
| | | | | 60 | 2 | 1 | |
| C | 1 | 0 | 0 | 0 | | | 138 |
| | | | | 15 | | | 50 |
| | | | | 30 | 4 | 5 | 44 |
| | | | | 45 | 4 | 5 | 57 |
| D | 1 | 0 | 0 | 0 | | | 132 |
| | | | | 15 | | | 78 |
| | | | | 30 | 3 | 4 | 41 |
| | | | | 45 | 5 | 3 | |
| | | | | 60 | 5 | 4 | |

[a] Lack of entry indicates test or measurement not performed.

We claim:
1. A conformable multilayer structure useful for packaging food for microwave cooking comprising:
   (a) at least one layer of flexible, heat-resistant, microwave-transparent polyester film susceptible to melting upon exposure to temperatures encountered when used in conjunction with a microwave susceptor in a microwave oven;
   (b) at least one layer of microwave susceptor material located on an interior surface of the film of (a) in sufficient quantity to cause the multilayer structure to heat under microwave cooking conditions to a temperature suitable for browning or crispening of food placed adjacent thereto;

(c) at least one layer formed from a melt extrudable olefin polymer having a thickness of at least 7 micrometers, having been crosslinked by exposure to at least 2 megarads of ionizing radiation, being crosslinked to a sufficient extend and present in a sufficient thickness to in combination substantially prevent melting of the structure when used in a microwave oven; and (d) an additional layer of flexible, heat-resistant, microwave-transparent film located adjacent to the layer (c) of crosslinked thermoplastic material.

2. The structure of claim 1 wherein the film of (a) is polyethylene terephthalate and the material of (c) is a copolymer of ethylene and 3 to 20 weight percent acrylic or methacrylic acid.

3. The structure of claim 2 wherein the copolymer of (c) has been crosslinked by exposure to at least the amount of ionizing radiation indicated by the formula $D=200/T$, where D is the dose of radiation in megarads and T is the thickness of the copolymer layer (c) in micrometers.

4. The structure of claim 2 wherein the copolymer of (c) has been crosslinked by exposure to approximately the amount of ionizing radiation indicated by the formula $D=375/T$, where D is the dose of radiation in megarads and T is the thickness of the copolymer layer (c) in micrometers.

5. A multilayer structure useful for packaging food for microwave cooking comprising:

(a) at least one layer of flexible, heat-resistant, microwave-transparent polyester film susceptible to melting upon exposure to temperatures encountered when used in conjunction with a microwave susceptor in a microwave oven;

(b) at least one layer of microwave susceptor material located on an interior surface of the film of (a) in sufficient quantity to cause the multilayer structure to heat under microwave cooking conditions to a temperature suitable for browning or crispening of food placed adjacent thereto;

(c) at least one layer formed from a melt extrudable olefin polymer having a thickness of at least 7 micrometers, having been crosslinked by exposure to at least 2 megarads of ionizing radiation, being crosslinked to a sufficient extent and present in a sufficient thickness to in combination substantially prevent distortion of the structure when used in a microwave oven; and (d) at least one layer of a microwave transparent and optically transparent substrate film located adjacent to the material of (c), which film does not melt upon exposure to temperatures encountered when used in conjunction with a microwave susceptor in a microwave oven and is selected from the group consisting of cellophane, polyimides, polyetherimides, polyesterimides, and polyarylates;

wherein said structure is conformable to said food.

6. The structure of claim 5 wherein the film of (a) is polyethylene terephthalate, the material of (c) is a copolymer of ethylene and 3 to 20 weight percent acrylic or methacrylic acid, and the film of (d) is cellophane.

7. The structure of claim 6 wherein the copolymer of (c) has been crosslinked by exposure to at least the amount of ionizing radiation indicated by the formula $D=125/T$, where D is the dose of radiation in megarads and T is the thickness of the copolymer layer (c) in micrometers.

* * * * *